Patented Apr. 9, 1940

2,196,596

UNITED STATES PATENT OFFICE 2,196,596

PURIFICATION OF ALKALI METAL HYDROXIDES

Irving E. Muskat, Akron, Ohio, assignor to Pittsburgh Plate Glass Company, Allegheny County, Pa., a corporation of Pennsylvania No Drawing. Application December 11, 1937,
Serial No. 179,337

20 Claims. (Cl. 23—184)

This invention relates to the purification of various compounds by treatment with amines in the liquid state. Of particular interest is the treatment of alkali metal hydroxides, especially sodium hydroxide, to remove undesired impurities which occur in these materials as an incident of their manufacture.

Caustic soda solutions, as initially produced in commercial processes, are relatively dilute solutions, the concentrations of which are in general, from 8 to 12% by weight. These solutions are contaminated with a large number of impurities, such as sodium sulphate, sodium chloride, chlorates, iron, etc., which must be removed in order to produce a commercially satisfactory product. Somewhere in the neighborhood of a 50% concentration is the point of minimum solubility of many of these impurities in caustic solution, and since the production of concentrated caustic is necessary in any event, the usual practice is to concentrate the impure caustic to this concentration and remove these impurities by settling and filtation.

If extreme purity is desired, crystallization of various hydrates of sodium hydroxide may be resorted to. For example, according to Patent No. 1,733,879 to Hooker and Marsh, the 50% filtered caustic liquor is diluted to approximately 39% at which concentration, the 3½ hydrate is caused to crystallize at a reduced temperature of 10° C. Approximately 50% of the caustic is crystallized. The impure mother liquor which contains the impurities cannot be satisfactorily purified and is sold as an impure product. The 3½ hydrate crystals are then melted and reconcentrated to 50%.

These various manipulations entail such a large expenditure of time, labor, and money that electrolytic caustic, which must be purified by such a process, has been at a decided disadvantage in competing with caustic made by the ammonia-soda process. Even after purifying electrolytic caustic by means of these expensive crystallization processes, the final purified product is more corrosive than lime-soda caustic.

The preparation of a purified caustic is further complicated by the fact that it is extremely difficult to maintain purity after the caustic has been purified. Since caustic soda is corrosive and is readily contaminated, every manipulation through which the caustic is put after it has been purified, results in contamination by reason of the fact that the caustic attacks the apparatus in which it is treated. Usually, it has been considered desirable to dehydrate the 50% caustic to produce 70-75% or even anhydrous caustic. The production of 70% caustic is usually carried out by vaporization at reduced pressures. Even with the best of equipment, the highly heated product corrodes the apparatus and becomes contaminated to such an extent that the production of a 70% product, having a purity equal to that of the initial 50% caustic from which it was produced, has not been satisfactorily accomplished by any commercial process of which I am aware.

The purity of the product is even further reduced when concentration from 70% to the anhydrous state is attempted. Since evaporation, as carried out with dilute caustic, is no longer possible, the caustic is placed in cast iron pots and vigorously heated in an open flame. In order to drive off the last traces of water, temperatures as high as 1100° F. must be resorted to. Again the corrosive nature of the caustic at these high temperatures is so great that it attacks the pot extensively. Sulphur must be added to precipitate the iron and even after complete dehydration the caustic must be kept molten for many hours to allow the precipitated iron to settle out. Even with these operations the commercial preparation of pure anhydrous caustic has been well nigh impossible. To my knowledge, there has been no process heretofore suggested which would produce commercial 70% or anhydrous caustic of a purity which even approximates that of a purified 50% solution.

In accordance with my invention, I am able to secure a substantial purification, reduction in corrosiveness, either with or without concentration of the alkali metal hydroxides and in particular of sodium hydroxide by treatment with water-soluble or water-miscible alkyl, aryl or aralkyl amines or mixtures thereof. Thus, when liquefied methylamine, for example, is mixed with an aqueous solution of sodium hydroxide, two liquid layers are formed. The upper layer contains most of the methylamine together with the water which has been absorbed from the caustic solution, while the lower layer comprises a concentrated solution of caustic. If an aqueous solution of caustic containing the impurities usually included during caustic production such as chlorate, chlorides, etc., is so treated, it will be found that these impurities will distribute themselves between the two layers and that the distribution ratio is such that only a minor portion of these impurities remain in the caustic solution.

After the treatment of sodium hydroxide with amines such as methylamine, I find that the resultant product is markedly less corrosive. This, I believe, is due to the removal of the impurities in the manner above stated. I am unable to state with accuracy all the impurities which are removed by this treatment. I do know that chlorides and chlorates which are commonly present in electrolytic caustic, are so removed and that these materials have a definite effect upon the corrosiveness of the caustic, but I am satisfied that other impurities, which I have not as yet been able to identify, are removed.

Anhydrous sodium hydroxide, when prepared by this process is a very finely divided light fluffy, porous product which I find has certain advantages over the ordinary caustic prepared by conventional processes.

The process is not limited to the treatment of sodium hydroxide but may be applied to the purification or concentration of any of the alkali metal hydroxides such as lithium hydroxide, potassium hydroxide, etc.

I am not limited to the use of methylamine since I find that amines which are soluble in or miscible with water, and which are liquid or liquefiable at the temperature of operation will be operative in this process. Thus, I may use soluble alkyl amines such as the primary, secondary, and tertiary methyl, ethyl, butyl, propyl, or amyl amines; mixed alkyl amines such as methyl-propyl amine; primary, secondary and tertiary polyamines such as ethylene diamine, hydrazine, propylene diamine, diethylene tetramine, etc., or aromatic amines such as aniline, or dimethyl aniline, or pyridine; or mixtures thereof. Generally speaking, I find that those amines which are most soluble in water are the best for my purpose.

If the amines used are normally gaseous at the temperature of operation, they are preferably liquefied under pressure. Usually, I prefer to use a normally gaseous, liquefied amine since I find that with such material, it is much easier to remove any quantity of amine which may be dissolved in the treated hydroxide solutions by release of the liquefying pressure. For this reason, I prefer to use the methyl or ethyl amines.

The process is capable of two variations. I may treat aqueous solutions of alkali metal hydroxides to concentrate and purify them, or I may treat them for purification purposes only, in which case no substantial concentration will be effected. For example, if an aqueous solution of an alkali metal hydroxide is treated with a liquefied amine to form two layers as previously set forth, it will be apparent that the concentration of water in the upper layer must be in substantial equilibrium with the amount of water in the lower layer. For this reason, if a caustic liquor having a concentration equal to that in the lower layer is treated with a liquid amine containing substantially the same concentration of water as is present in the upper layer, no substantial concentration of the caustic will be secured. At the same time, the impurities will distribute themselves as was previously set forth and substantial removal of impurities from the caustic will be effected. Very often it is desirable to purify either anhydrous or aqueous hydroxides without making any substantial change in their water content and in accordance with my invention, I am able to do so by controlling the amount of water present during treatment. If an anhydrous hydroxide were to be purified, for example, anhydrous amines would usually be used for the treatment; and if an aqueous solution of the hydroxide were to be treated, the process would be carried out in the presence of enough water to inhibit substantial concentration of the hydroxide being treated.

In most cases, it is not vital to so exactly adjust the amine-water ratio that absolutely no concentration or dilution occurs in this modification. Usually, it is only necessary to treat the caustic with an amine liquor of such degree of hydration that approximately no concentration occurs and a leeway of one, two or even five percent may be permissible in some cases.

The following examples illustrate my process:

Example I

Two parts by weight of an aqueous solution of electrolytic caustic, having the following analysis,

|  | Percent |
|---|---|
| NaOH (approx.) | 50 |
| NaCl | 0.97 |
| NaClO$_3$ | 0.42 | are treated with three parts by weight of liquefied methylamine liquor consisting of approximately 75% methylamine and 25% water, at a temperature of 25° C. The phases formed are separated and the caustic is found to have the following analysis on the amine free basis,

|  | Percent |
|---|---|
| NaOH (approx.) | 50 |
| NaCl | 0.18 |
| NaClO$_3$ | Trace |

This caustic was found to be much less corrosive than the original caustic before treatment

Example II

One part by weight of 50% lime soda caustic, containing 0.43% of NaCl is treated with a liquor such as described in Example I at a temperature of 70° C., a 50% caustic containing 0.05% NaCl was produced.

Example III

One part by weight of caustic soda having the following analysis,

|  | Per cent |
|---|---|
| NaOH (approx.) | 60 |
| NaCl | 0.93 |
| NaClO$_3$ | 0.38 | is treated with three parts by weight of ethylamine liquor containing about 17% water and a caustic having the following analysis,

|  | Per cent |
|---|---|
| NaOH (approx.) | 60 |
| NaCl | .19 |
| NaClO$_3$ | .00 | is produced.

Example IV

About 180 parts, by weight, of 50% NaOH was washed with five portions of anhydrous liquefied ethylamine having a combined weight equal to about eight times that of the NaOH present. The original solution contained 1.13% NaCl while the resultant product was a porous, fluffy, substantially anhydrous caustic containing only 0.24% NaCl.

Example V

A stream of 50% caustic liquor was treated counter-currently with liquid methylamine in the proportion of two parts by weight of liquor to three parts by weight of amine at a temperature of 65° C. A concentrate of approximately 68% strength was produced.

Example VI 200 parts, by weight, of anhydrous ethyl amine was added to 100 parts by weight of a 24% aqueous solution of sodium hydroxide. The mixture was heated to 60° C. and two liquid layers separated. The lower layer, after removal of the amine, contained an aqueous solution of NaOH of about 46% by weight.

Temperatures, pressures, and concentrations of amine and hydroxide solutions are capable of wide variation. The pressure can be of any convenient magnitude, but it is preferable that the amine be in a liquid state. Temperatures must however be below the critical temperature for liquefaction of the amine used, but otherwise, may be varied considerably. Usually, a temperature of from 50-70° C. is considered optimum when concentration is desired, but much lower temperatures, (0° C. and above), may be used when purification or crystallization alone is desired. In general, I treat one part of hydroxide solution to 0.5-10 parts of amine calculated upon the basis of the actual amount of hydroxide in the solution but this ratio also is capable of wide variation.

I am not limited to the production of a liquid concentrate since I find that this process is capable of yielding any concentrates desired whether they be liquid or solid, hydrated or anhydrous. Manifestly, if I wish to prevent the precipitation of any particular hydrate, I merely operate at a temperature about that at which that hydrate would solidify and if desired, the solidification of only substantially anhydrous product is obtained by operating at a temperature at which only the anhydrous hydroxide can precipitate.

Similarly, I am not limited to the treatment of liquid concentrates as I may, if desired, purify and/or concentrate solid hydroxides by washing with the liquid amine. In such a treatment, the solid hydroxide can remain as a solid, or it may be heated to a temperature above its softening or melting point during or before treatment. Furthermore, I can combine this process with various other concentration or purification processes. For example, I find that an extremely pure product can be produced by solidifying or crystallizing out a solid product during or shortly after treatment. This solid product is found to be extremely free from impurities. In addition, I can combine this process with various other concentrating processes. Since concentration of caustic in ordinary evaporation up to 50% concentration is a relatively simple matter, I often find it advisable to concentrate up to this point by the usual methods and then carry out my treatment with liquid amine. A very effective operation in accordance herewith is to concentrate up to approximately 46-50% and then treat with a liquid amine in the presence of sufficient water to dilute to 39% and precipitate out the 3½ hydrate. This hydrate may then be redissolved and reconcentrated by any desired process. In this connection, it is desired to call attention to the fact that a 50% concentrate being the point of minimum solubility for many impurities found in hydroxide solution, it is often found best to concentrate to this value before resorting to any amine purification process since much less amine is required to effect satisfactory results at this or higher concentrations.

In some cases it may be desirable to use mixtures of ammonia and amines. These mixtures may either be gaseous or liquid and may comprise gaseous amines dissolved in liquid ammonia, gaseous ammonia dissolved in liquid amines or mixtures of liquid amines with liquid ammona or gaseous amines with gaseous ammonia. The ratio of amine to ammonia is capable of wide variation and the mixture may vary all the way from a trace to 100 per cent amine.

Any of the conventional methods of contacting the hydroxide with amines may be used in carrying out this invention. Thus, the treatment may be carried out in batch or countercurrent operations, or the like. A single treatment can not in general, effect complete dehydration and it is therefore usually desirable to effect the treatment by a progressive removal of water by treatment with progressively increasing concentrations of amine, repeated washing, etc. Preferably, I use the methods used for treatment with liquid ammonia described in my copending application, Serial No. 179,334, filed December 11, 1937.

Again I wish to point out that wherever I have referred specifically to sodium hydroxide, I mean to include all of the alkali metal hydroxides as I find that the precipitation and concentration of potassium and lithium hydroxides may also be effected by use of amines, of the types hereinbefore referred to.

Although the present invention has been described in connection with the specific details of certain embodiments thereof, it is not intended that these details shall be regarded as limitations upon the scope of the invention except in so far as is included in the accompanying claims.

The term "hydrated alkali metal hydroxide" or "hydrated sodium hydroxide" is intended to include both aqueous solutions of these hydroxides and solid hydroxides containing water.

The terms "impure hydroxides," "impure hydrated sodium hydroxide," "impure anhydrous alkali metal hydroxides," etc., are intended to include hydroxides which are contaminated with water or hydroxides which are contaminated with an alkali metal compound such as chloride and/or chlorate. The terms "purified alkali metal hydroxides" or "purified sodium hydroxide" are intended to include hydroxide from which either water or other impurity have been removed.

I claim:

1. The process of purifying hydrated impure hydroxides of the alkali metals which comprises contacting the same with a water-soluble organic amine at temperatures such as to maintain the amine in liquid state and separating purified alkali metal hydroxide from said amine.

2. The process of purifying impure hydroxides of the alkali metals which comprises contacting the same with a water-soluble aliphatic amine at temperatures such as to maintain the amine in liquid state and separating purified alkali metal hydroxide from said amine.

3. The process of purifying impure hydroxides of the alkali metals which comprises contacting the same with a water-soluble aryl amine at temperatures such as to maintain the amine in liquid state and separating purified alkali metal hydroxide from said amine.

4. The process of purifying impure hydroxides of the alkali metals which comprises contacting the same with a water-soluble aralkyl amine at temperatures such as to maintain the amine in liquid state and separating purified alkali metal hydroxides from said amine.

5. The process of purifying impure hydrated sodium hydroxide which comprises contacting the same with a water-soluble hydrocarbon amine at temperatures such as to maintain the amine in liquid state and separating purified sodium hydroxide from said amine.

6. The process of purifying impure hydrated sodium hydroxide which comprises washing the same with a water-soluble alkyl amine in liquid state and separating purified sodium hydroxide from said amine.

7. The process of purifying impure hydrated sodium hydroxide which comprises treating the same with a methylamine at a temperature and pressure such as to maintain the methylamine in liquid state and separating purified sodium hydroxide from said amine.

8. The process of purifying impure hydrated sodium hydroxide of a concentration not substantially less than about 50%, which comprises treating the same with a water-soluble alkyl amine at a temperature and pressure such as to maintain the alkyl amine in liquid state and separating purified sodium hydroxide from said amine.

9. The process of purifying impure hydrated hydroxides of the alkali metals which comprises washing the same with a water-soluble organic amine in liquid state and sufficient water to inhibit substantial concentration of the hydroxide by the amine and separating purified alkali metal hydroxide from said amine.

10. The process of purifying impure hydrated sodium hydroxide which comprises washing the same with a water-soluble organic amine in liquid state and sufficient water to inhibit substantial concentration of the hydroxide by the amine and separating purified sodium hydroxide from said amine.

11. The process of purifying impure hydrated sodium hydroxide which comprises washing same with a methyl amine in liquid state and sufficient water to inhibit substantial concentration of the hydroxide by the methyl amine and separating purified sodium hydroxide from said amine.

12. The process of purifying impure anhydrous alkali metal hydroxides which comprises washing the same with a water-soluble organic amine in liquid state and separating purified alkali metal hydroxide from said amine.

13. The process of purifying impure anhydrous sodium hydroxide which comprises washing the same with a water-soluble aliphatic amine in liquid state and separating purified sodium hydroxide from said amine.

14. The process of purifying impure anhydrous sodium hydroxide which comprises washing the same with a water soluble aralkyl amine in liquid state and separating purified sodium hydroxide from said amine.

15. The process of purifying impure anhydrous sodium hydroxide which comprises washing the same with methyl amine in liquid state and separating purified sodium hydroxide from said amine.

16. The process of purifying impure anhydrous sodium hydroxide which comprises washing the same with ethyl amine in liquid state and separating purified sodium hydroxide from said amine.

17. The process of purifying or concentrating solid hydrated alkali metal hydroxide which comprises extracting said hydroxide, while in the solid state, with a water-soluble organic amine in a liquid state and separating purified alkali metal hydroxide from said amine.

18. The process of purifying or concentrating impure hydrated hydroxides of the alkali metals which comprises contacting the same with a liquid mixture comprising an organic amine and ammonia and separating purified alkali metal hydroxide from said amine.

19. The process of purifying an alkali metal hydroxide which comprises contacting the same with a liquid mixture comprising an organic amine and ammonia and separating purified alkali metal hydroxide from said amine.

20. A method of purifying alkali metal hydroxides which comprises contacting the same with a water-soluble organic amine in liquid state and separating purified alkali metal hydroxide from said amine.

IRVING E. MUSKAT.